United States Patent
Nagashima et al.

(10) Patent No.: US 7,148,421 B2
(45) Date of Patent: Dec. 12, 2006

(54) VEHICLE OUTLET COVER

(75) Inventors: Shinyu Nagashima, Yokkaichi (JP); Akihito Maegawa, Yokkaichi (JP); Mitsuru Tanigawa, Yokkaichi (JP); Hiroyuki Kashiki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 6 days.

(21) Appl. No.: 10/994,490

(22) Filed: Nov. 22, 2004

(65) Prior Publication Data

US 2005/0109529 A1   May 26, 2005

(30) Foreign Application Priority Data

Nov. 21, 2003   (JP) .............................. 2003-392468

(51) Int. Cl.
*H02G 3/14*   (2006.01)

(52) U.S. Cl. .................. 174/67; 174/66; 174/53; 174/50; 174/480; 174/481; 174/60; 174/63; 174/55; 439/535; 439/35; 220/3.2; 220/3.6; 220/3.8; 220/241; 220/242; 220/4.02

(58) Field of Classification Search .............. 174/67, 174/53, 66, 50, 48, 60, 63, 5, 55, 58, 480, 174/481; 220/3.2, 3.8, 3.6, 241, 242, 4.02; 439/535, 35
See application file for complete search history.

(56) References Cited

U.S. PATENT DOCUMENTS

| | | | | | |
|---|---|---|---|---|---|
| 4,979,634 A | * | 12/1990 | Begley | ....................... | 220/242 |
| 5,382,171 A | * | 1/1995 | Hofmann et al. | ........... | 439/142 |
| 6,444,906 B1 | * | 9/2002 | Lewis | ....................... | 174/53 |
| 6,814,581 B1 | * | 11/2004 | Matsuo et al. | ................ | 439/35 |

FOREIGN PATENT DOCUMENTS

JP   8-154310   6/1996

* cited by examiner

*Primary Examiner*—Dean A. Reichard
*Assistant Examiner*—Anton Harris
(74) *Attorney, Agent, or Firm*—Gerald E. Hespos; Anthony J. Casella (57) ABSTRACT

A lid (20) and a cover main body (10) are formed with sliding contacts (17, 23) that slide in sliding contact with each other immediately before the lid (20) reaches a lid-closing position for damping biasing forces given from coil springs (30) to the lid (20). Frictional resistance is created by the sliding contact of the sliding contacts (17, 23) and the biasing forces given from the torsion coil springs (30) to the lid (20) are damped by this frictional resistance. In this way, an impact given when the lid (20) reaches the cover main body (10) at the lid-closing position is alleviated.

13 Claims, 9 Drawing Sheets

VEHICLE OUTLET COVER

BACKGROUND OF THE INVENTION

1. Field of the Invention

The present invention relates to a vehicle outlet cover.

2. Description of the Related Art

Vehicles, such as pickup trucks, may have an outlet that has an insertion opening exposed to the outside of the vehicle so that power can be supplied to a towed vehicle or to an electric motor outside the vehicle. Japanese Unexamined Patent Publication No. H08-154310 discloses an outlet of this kind with a lid displaceably supported on a cover main body of the outlet to prevent water and dust from entering the insertion opening. The insertion opening is opened and closed by this lid. A spring is provided to bias the lid in closing direction to close the insertion opening when the outlet is not used. The spring has a strong biasing force to ensure that the lid is not moved in opening direction by an injection pressure of high-pressure washing water and vibration during running.

A strong spring will cause the lid to collide with the cover main body. As a result, a large collision sound may be produced and the lid or the cover main body may be damaged by an impact of the collision.

The invention was developed in view of the above problem and an object thereof is to alleviate an impact given when a lid is closed to come into contact with a cover main body.

SUMMARY OF THE INVENTION

The invention relates to a vehicle outlet cover with a cover main body fixed to an outer surface of a vehicle to expose an insertion opening. A lid is supported on the cover main body for displacement between a lid-closing position where the lid closes the insertion opening and a lid-opening position where the lid opens the insertion opening. A biasing member is provided for biasing the lid towards the lid-closing position. The lid and the cover main body have sliding contacts for damping a biasing force given by the biasing member to the lid. The sliding contacts slide in contact with each other immediately before the lid reaches the lid-closing position in a displacement path of the lid from the lid-opening position to the lid-closing position.

The lid of the vehicle outlet cover is rotatable about a rotatable shaft and the sliding-contact portions are formed on circumferential surfaces having centers at the rotatable shaft. As a result, there is no likelihood of reducing or losing the frictional resistance acting between the sliding-contact portions even if the lid is longitudinally displaced.

The sliding-contacts preferably are separated from each other when the lid is at the lid-closing position.

Frictional resistance caused by the sliding contact of the sliding-contact portions is created immediately before the lid reaches the lid-closing position, and the biasing force given from the biasing member to the lid is damped by this frictional resistance. In this way, a smaller impact occurs when the lid contacts the cover main body at the lid-closing position.

The biasing force of the biasing member is not damped by frictional resistance between the sliding-contacts after the lid reaches the lid-closing position to close the insertion opening. Thus, the lid can be held securely held at the lid-closing position by the biasing member.

DETAILED DESCRIPTION OF THE PREFERRED EMBODIMENTS

A vehicle outlet cover according to the invention is identified by the letter A in FIGS. 1 to 10. The vehicle outlet cover A is mounted on an outer surface of a vehicle V, such as a pick-up truck, and protects an outlet C on the vehicle V. The outlet C may be provided to supply power to a vehicle that is to be towed or to provide power to an electric motor outside the vehicle. The vehicle outlet cover A includes a cover main body 10 and a lid 20 each of which preferably is made of a synthetic resin filled with glass fibers. The vehicle outlet cover A also has metallic torsion coil springs 30.

The cover main body 10 is fixed to the outer surface of the vehicle V and selectively exposes insertion openings 11 that accommodate a plug (not shown) for supplying power to an apparatus outside the vehicle V. The cover main body 10 is a substantially rectangular plate, and a substantially rectangular connecting portion 12 projects forward from the center of the connecting portion 12. The insertion openings 11 penetrate the connecting portion 12 at locations that correspond to terminals (not shown) of the outlet C.

Two transversely symmetrical bearings 13 project forward near the top of the front surface of the cover main body 10 and round bearing holes 14 concentrically penetrate the bearings 13 in a transverse direction. The terms top, bottom, upper and lower are used herein to provide a convenient frame of reference and are not intended to imply a required gravitational orientation. A protrusion 15 protrudes forward near the upper end of the front surface of the cover main body 10 in an area between the bearings 13 and below the bearing holes 14. The upper surface of the protrusion 15 is horizontal, and a narrow and long slanted portion 16 extends transversely at a boundary between the upper and front surfaces of the protrusion 15. Sliding contacts 17 are formed at opposite left and right ends of the slanted portion 16, and hence at positions closer to the inner surfaces of the bearings 13 that face each other. Two spring receiving holes 18 penetrate the upper end of the cover main body 10 in forward and backward directions at positions inward from the sliding-contacts 17 between the bearings 13. The lower surfaces of the spring receiving holes 18 are flush with and continuous with the upper surface of the protrusion 15.

The lid 20 is supported rotatably on the cover main body 10 for rotation between a lid-closing position (see FIGS. 3 and 6) where the lid 20 closes the insertion openings 11 and a lid-opening position (see FIGS. 1 and 4) where the insertion openings 11 are exposed to the outside. The lid opening position (FIGS. 1 and 4) is spaced from the lid closing position (FIGS. 3 and 6) by more than 90°, and preferably at least about 135°. Two transversely symmetrical supports 21 project back at a portion of the lid 20 that is in an uppermost position when the lid is closed. Round rotatable shafts 22 project from outer surfaces of the supports 21 and are fittable into the corresponding bearing holes 14 for smooth rotation without radial movement (i.e. forward, backward or vertically). Thus, the shafts 22 fit in the bearing holes 14 so that the lid 20 can rotate with respect to the cover main body 10. Outer surfaces of the supports 21 are held in sliding contact with inner surfaces of the bearings 13 and cannot shake transversely in a way that would hinder rotation of the lid 20. In this way, the lid 20 can be positioned longitudinally with respect to the cover main body 10.

The supports 21 are substantially arcuate and are substantially concentric with the rotatable shafts 22. More specifically, sliding contacts 23 are formed on the outer circumferential surface of each support 21 and define areas of maximum outer diameter. The sliding contacts 23 of the supports 21 are in an area corresponding to the sliding-contact 17 of the cover main body 10 when the lid 20 is in a damping area, which is in and near the position shown in FIGS. 2 and 5 and slightly more toward the lid-opening position than the lid-closing position. The dampening area preferably extends through an arc of between about 5° and 25°, and most preferably an arc of between about 10° and 15°. The dampening area preferably ends at a rotational position of between about 5° and 15°, and most preferably about 10°, from the lid closing position shown in FIGS. 3 and 6. The sliding contacts 17, 23 are held strongly in contact as the lid 20 is rotated through the dampening area to create large friction resistance. However, the sliding contacts 17, 23 are not in contact when the lid 20 is rotationally beyond the damping area. A ring-shaped seal 24 is mounted to the inner face of the lid 20 and seals the front surface of the connecting portion 12 in the area of the insertion openings 11. Thus, the insertion openings 11 are sealed when the lid 20 the lid is closed.

Each torsion coil spring 30 has a coil 31. Long and short arms 32 and 33 extend generally radially at opposite ends of the coil 31. The torsion coil spring 30 is mounted by fitting the coil 31 on a receiving shaft 34 that projects from the inner surface of the corresponding support 21 concentrically with the rotatable shaft 22. An extending end of the short arm 33 is locked by a spring receiving portion 35 of the corresponding support 21, whereas the long arm 32 is locked by being fitted into the corresponding spring receiving hole 18 of the cover main body 10. The torsion coil springs 30 give the lid 20 a rotating force toward the lid-closing position.

Figure 1:
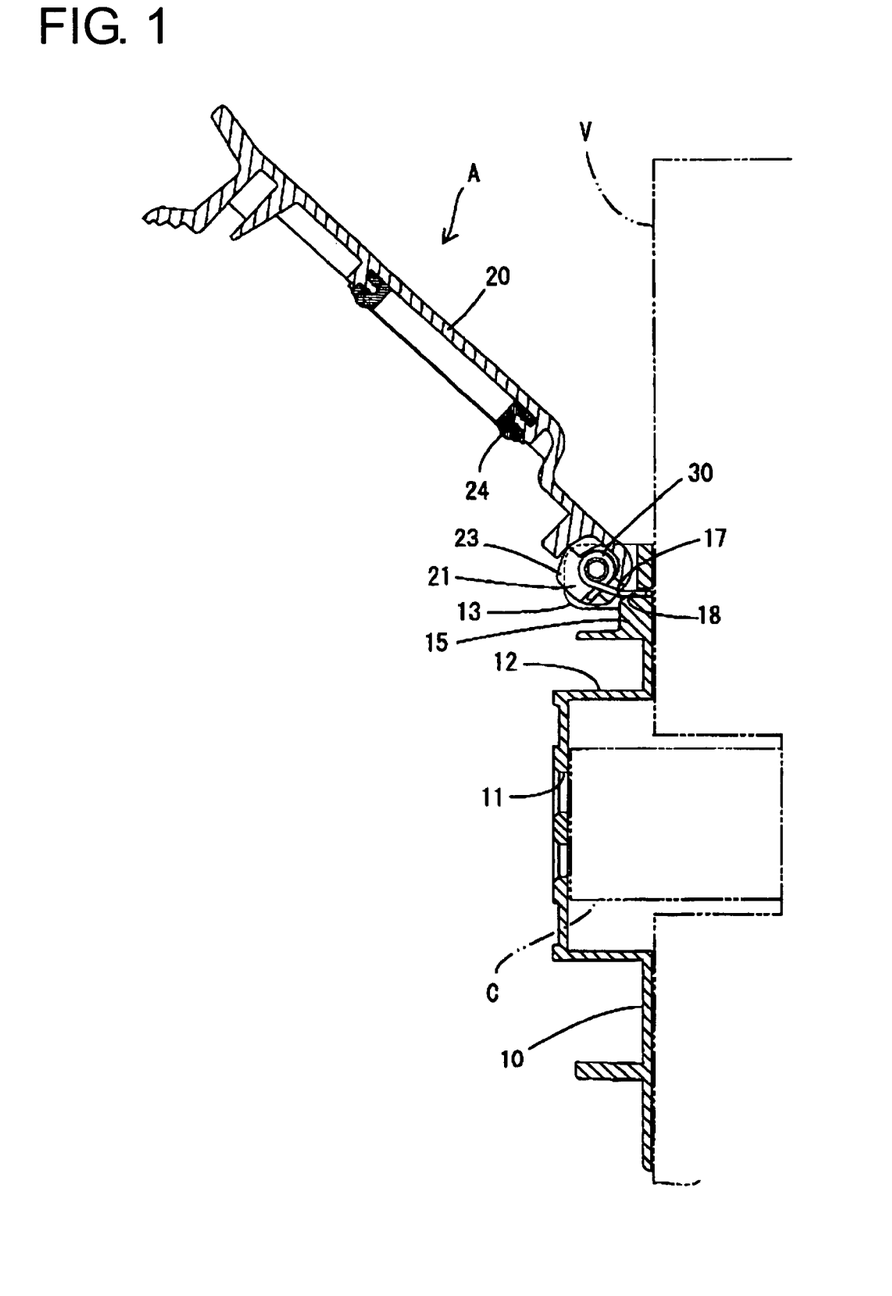
FIG. 1 is a section showing a state where a lid is located at a lid-opening position in one embodiment of the invention.
Figure 2:
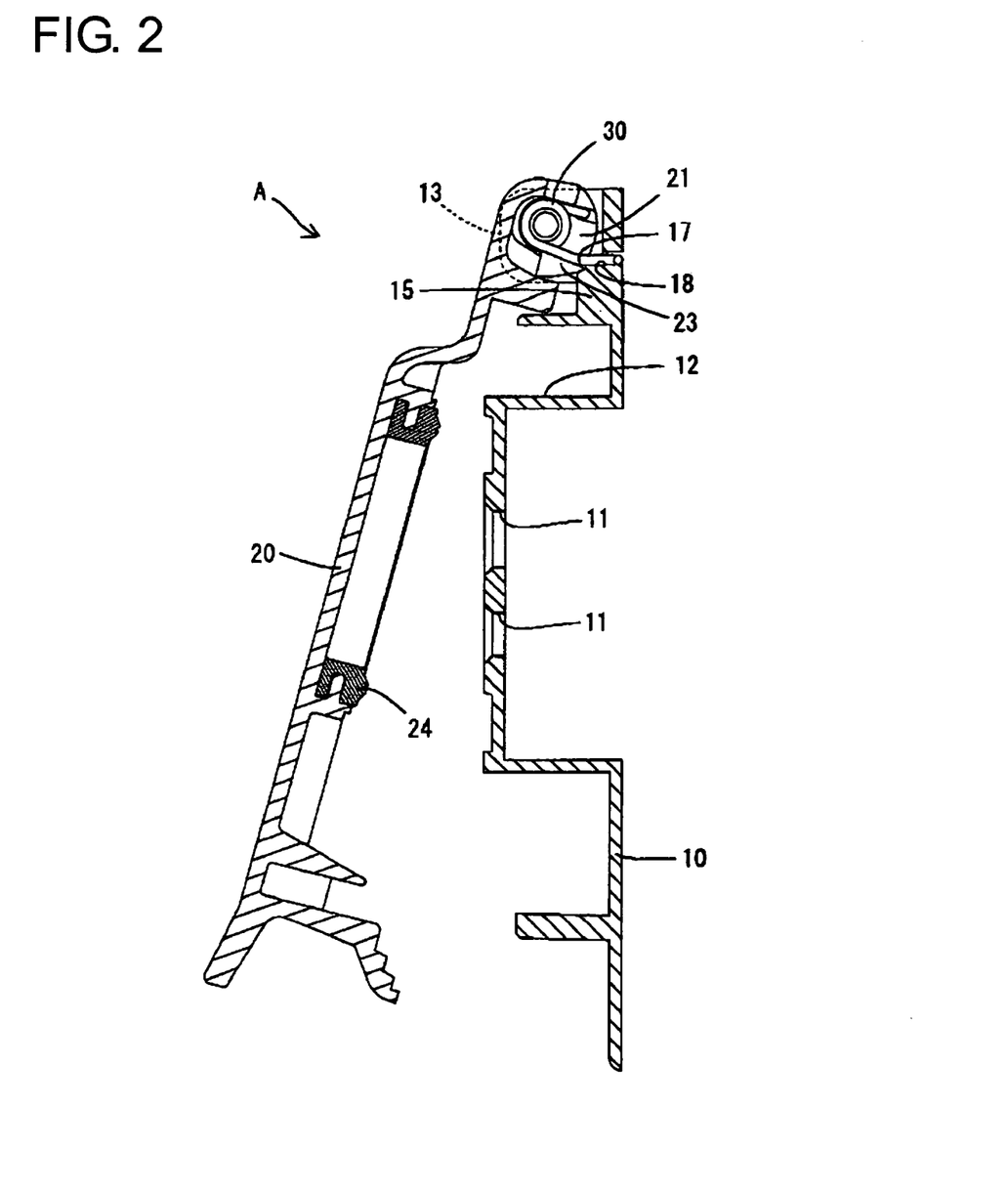
FIG. 2 is a section showing a state where sliding-contact portions come into sliding contact with each other immediately before the lid reaches a lid-closing position.
Figure 3:
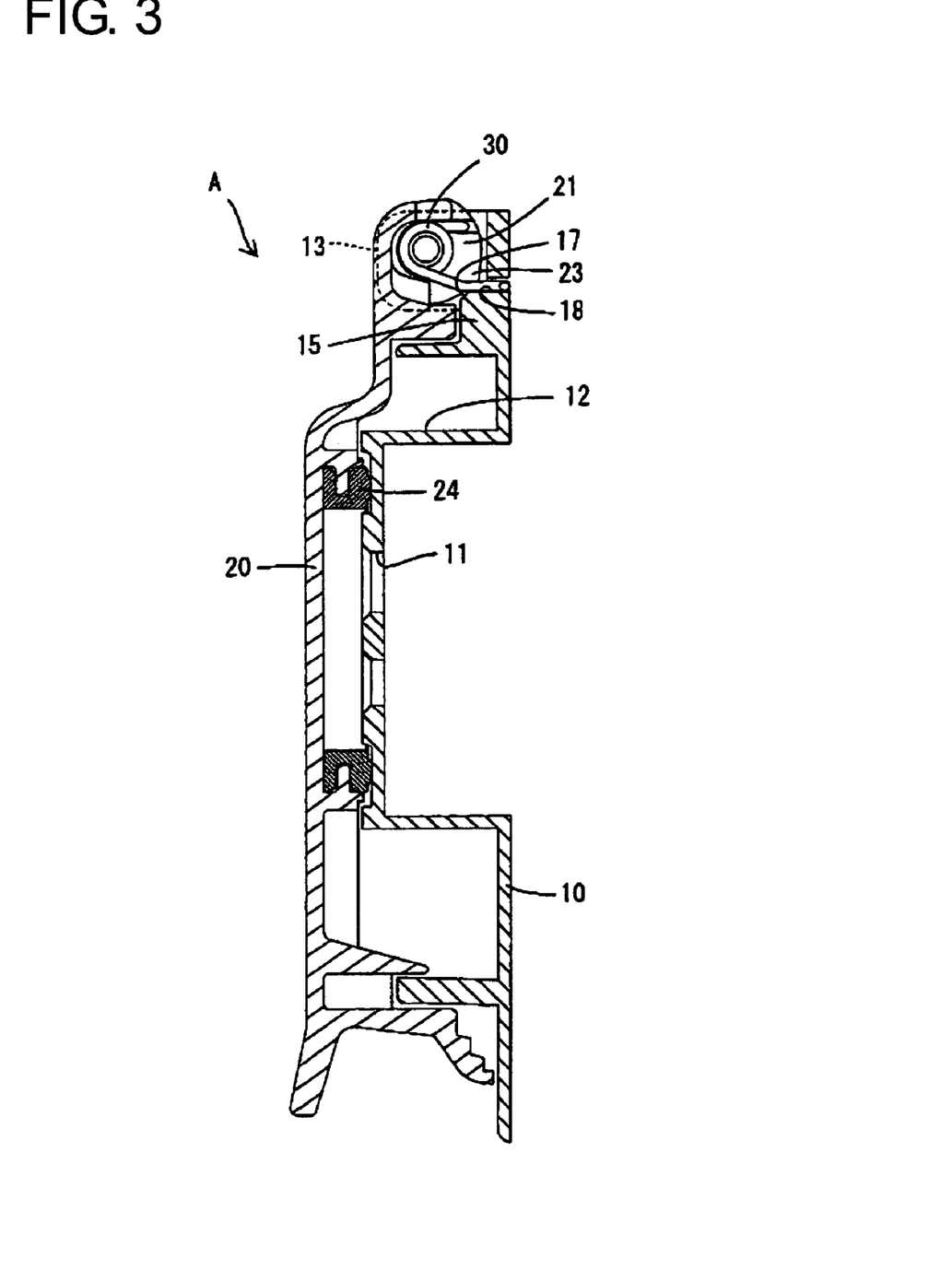
FIG. 3 is a section showing an arrival of the lid at the lid-closing position.
Figure 4:
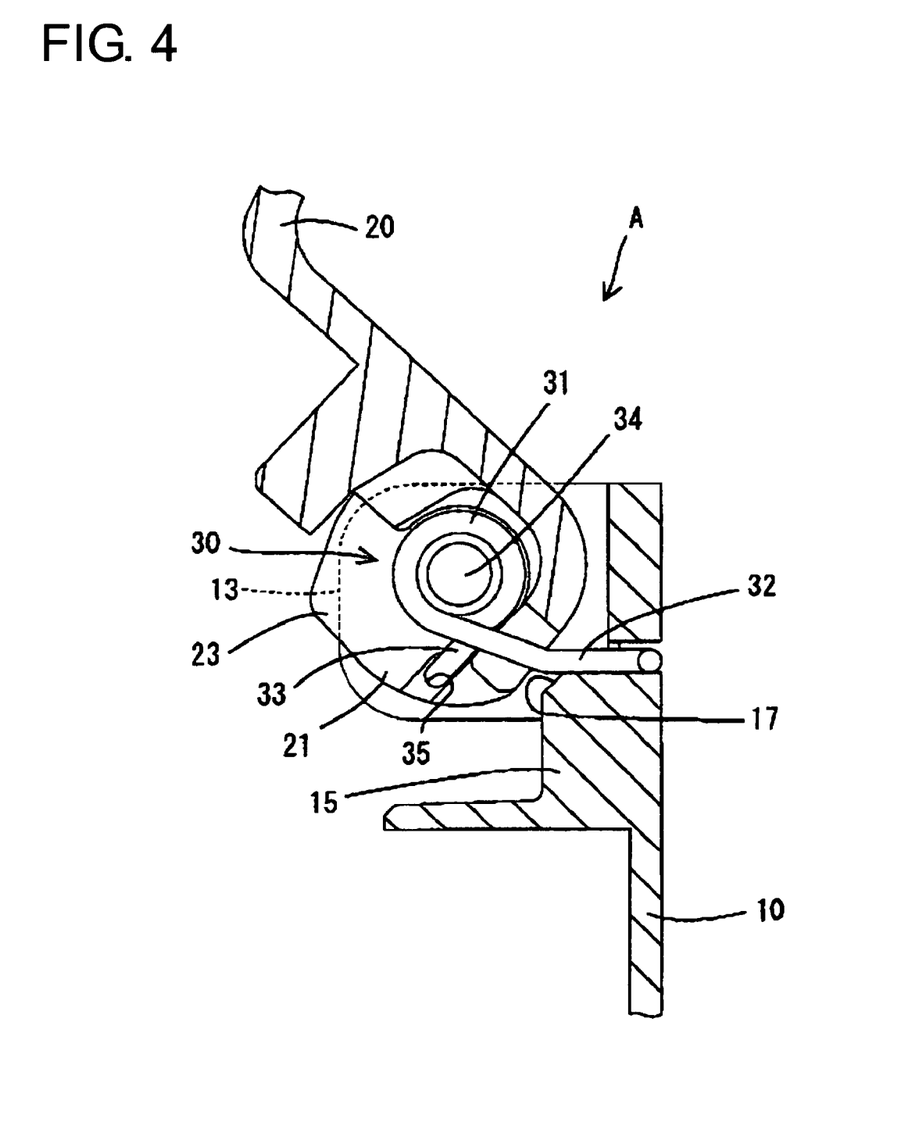
FIG. 4 is a partial enlarged section of FIG. 1.
Figure 5:
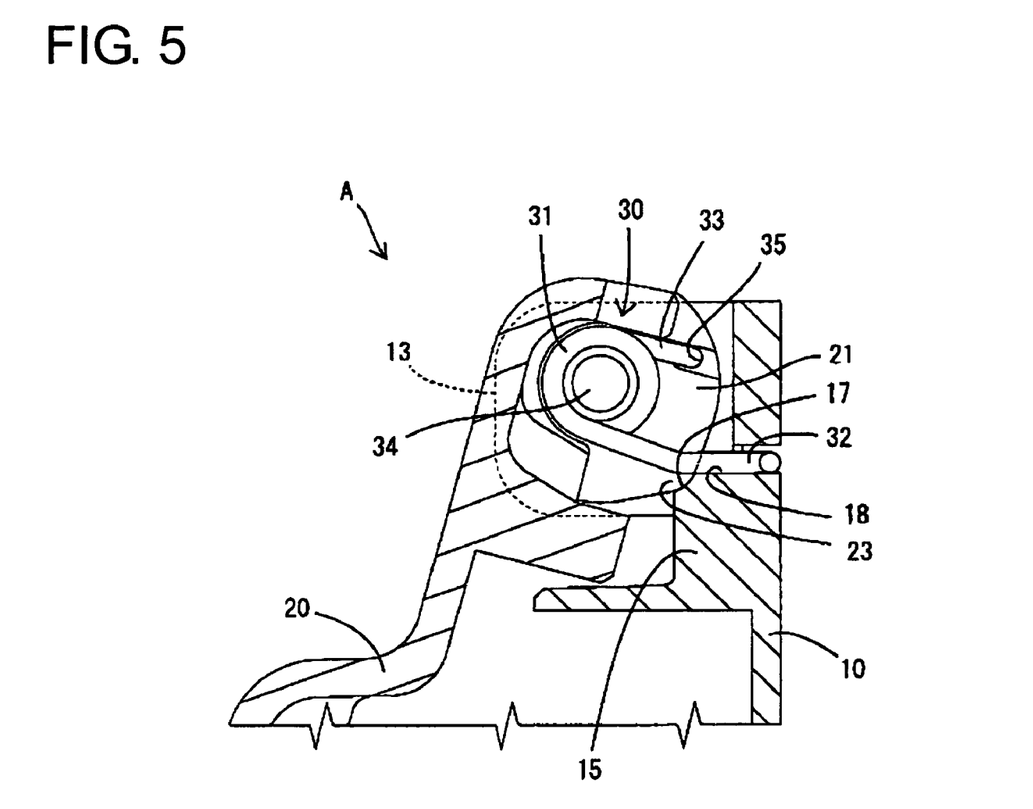
FIG. 5 is a partial enlarged section of FIG. 2.
Figure 6:
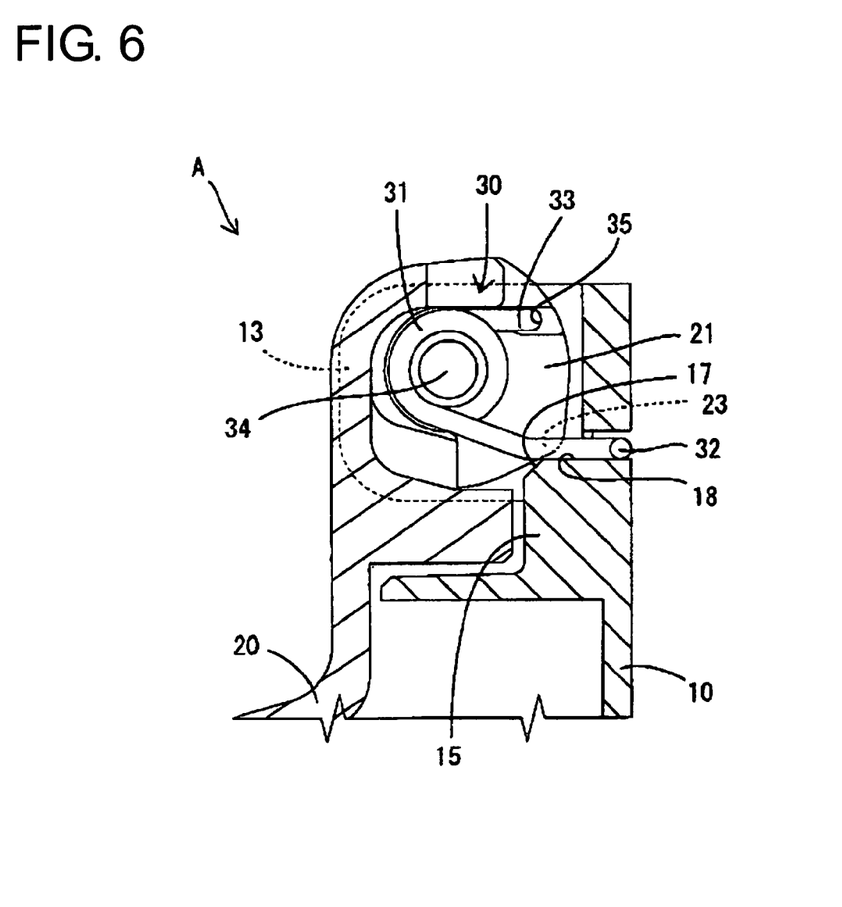
FIG. 6 is a partial enlarged section of FIG. 3.
Figure 7:
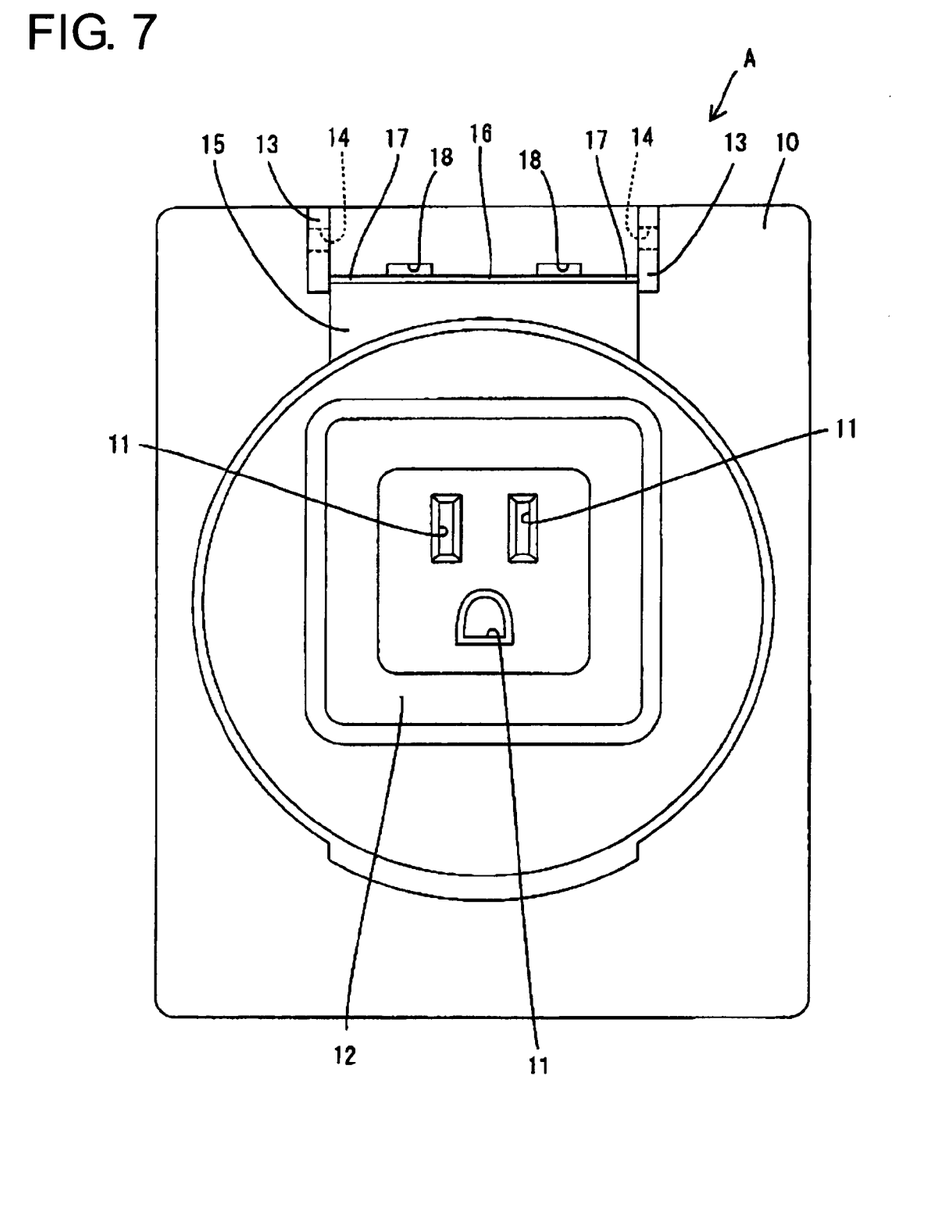
FIG. 7 is a front view of a cover main body with the lid detached.
Figure 8:
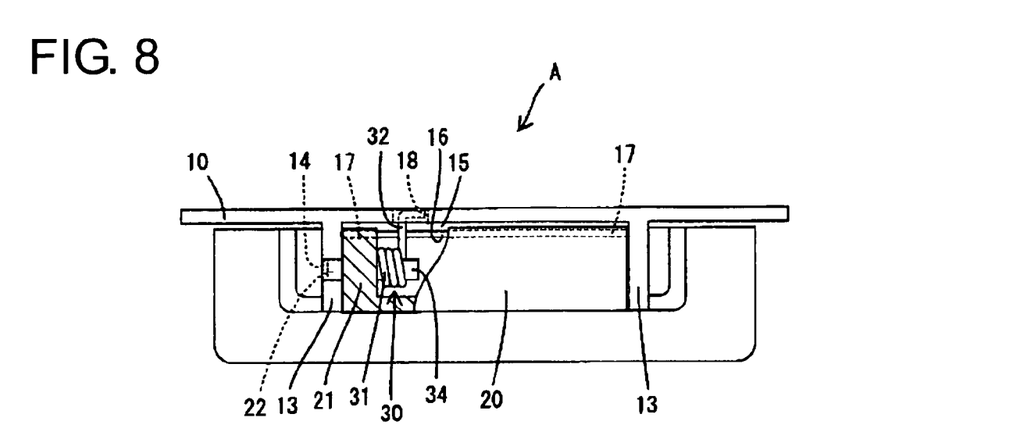
FIG. 8 is a plan view partly in section showing a state where the lid is located at the lid-closing position.
Figure 9:
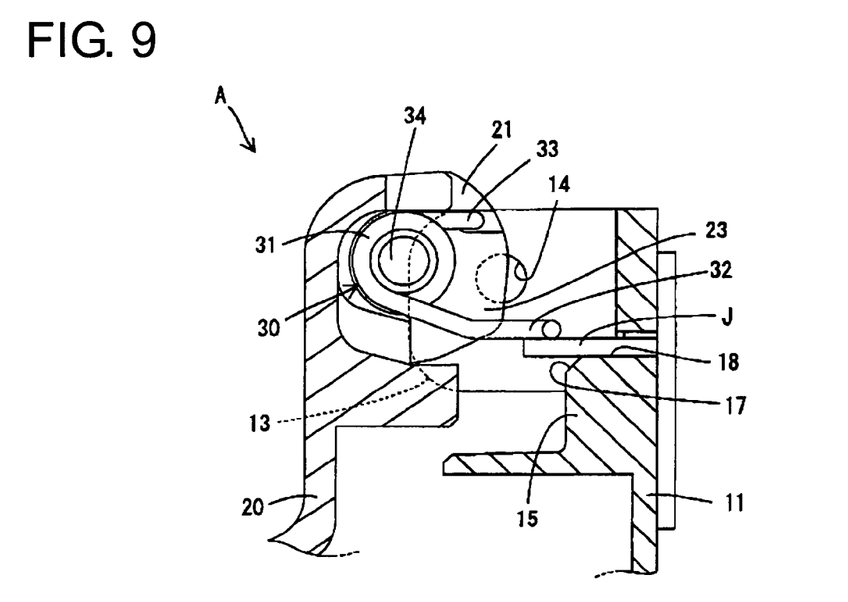
FIG. 9 is a section showing a process of assembling the lid with the cover main body.
Figure 10:
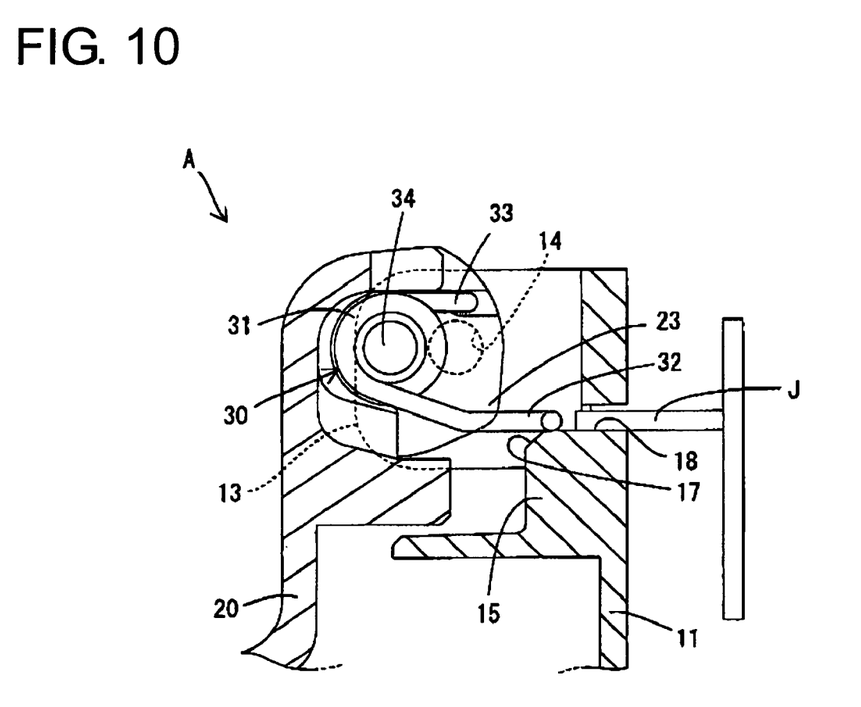
FIG. 10 is a section showing a process of assembling the lid with the cover main body.

The lid 20 is assembled with the cover main body 10 by resiliently displacing the bearings 13 out and resiliently displacing the supports 21 in. The rotatable shafts 22 then are fit into the bearing holes 14. Simultaneously, the long arms 32 of the torsion coil springs 30 are fit into the spring receiving holes 18 of the cover main body 10. Biasing forces accumulated in the coil springs 31 urge the long arms 32 down, and it is difficult to insert the long arms 32 into the narrow spring receiving holes 18 against these resilient restoring forces. Accordingly, a jig J is used. The jig J projects forward over a long distance through the spring receiving hole 18 from the rear side of the cover main body 10. The supports 21 and the cover main body 10 are spaced apart by distancing the lid 20 forward with respect to the cover main body 10, as shown in FIG. 9, so that the positions of the jig J and the long arms 32 can be seen from above. In this state, the long arms 32 are placed on the upper surface of the jig J. The lid 20 then is brought horizontally closer to the cover main body 10 so that the leading ends of the long arms 32 slide on the upper surface of the jig J and approach the spring receiving holes 18. The jig J is withdrawn after the lid 20 is brought close enough to the cover main body 10 for the leading ends of the long arms 32 to be right above the upper surface of the protrusion 15. The leading ends of the long arms 32 then are placed on the upper surface of the protrusion 15 as shown in FIG. 10. The leading ends of the long arms 32 enter the spring receiving holes 18 if the lid 20 is brought closer to the cover main body 10 in this state. At this time, the upper surface of the protrusion 15 is flush with and continuous with the lower surfaces of the spring receiving holes 18. Thus, the lid 20 can be assembled smoothly without catching the long arms 32.

The lid 20 is biased to the lid-closing position by the torsion coil springs 30, and thus closes the insertion openings 11. The seal 24 prevents water and other external matter from entering the insertion openings 11 when the lid 20 is 24 in this lid-closed state.

The lid 20 can be lifted up by hand and against the biasing forces of the torsion coil springs 30 from the lid-closing position to expose the insertion openings 11. A plug (not shown) then can be is inserted into the insertion openings 11 so that the outlet C can be used. At this time, the biasing of the torsion coil springs 30 displaces the lid 20 slightly towards the lid-closing position so that the lid 20 contacts the upper surface of the plug.

The lid 20 on the plug is lifted up by hand from the plug after the outlet C is used and the plug is pulled out. The hold on the lid 20 then is released and the resilient restoring forces of the torsion coil springs 30 rotate the lid 20 down with force towards the lid-closing position. The lid 20 reaches the damping area before the lid-closing position, and the sliding-contacts 17, 23 rub strongly against each other to produce a large friction resistance. At this time, the sliding contacts 23 of the lid 20 come substantially horizontally into contact with the sliding contacts 17 of the cover main body 10 from front and then are displaced obliquely up to the back along the inclination of the sliding contacts 17. The resilient restoring forces of the torsion coil springs 30 that rotate the lid 20 towards the lid-closing position are weakened by the frictional resistance between the sliding contacts 17, 23, and therefore the rotating speed of the lid 20 suddenly decreases. The sliding contacts 23 of the lid 20 eventually pass the sliding contacts 17 of the cover main body 10 and separate from the sliding contacts 17. As a result, the lid 20 reaches the lid-closing position with the rotating force of the lid 20 towards the lid-closing position increased by the biasing of the torsion coil springs 30. However, the speed of the lid 20 was decreased by the frictional resistance between the sliding contacts 17 and 23 before the rotating force of the lid 20 is increased by the torsion coil springs 30 (when the lid 20 passes the damping area), and an angle of rotation of the lid 20 from the damping area to the lid-closing position is small. Thus, the rotating speed (rotation torque) of the lid 20 is still low when the lid 20 reaches the lid-closing position. Therefore, a collision energy given by the lid 20 to the cover main body 10 when the lid 20 reaches the lid-closing position is small, and an impact is reduced sufficiently.

The lid 20 and the cover main body 10 have the sliding contacts 17, 23 for damping the biasing forces given to the lid 20 by the torsion coil springs 30. The sliding contacts 17, 23 slide against each other in the damping area of the displacement path, which is immediately before the lid 20 reaches the lid-closing position. The biasing forces given to the lid 20 by the torsion coil springs 30 are damped by the frictional resistance, thereby alleviating the impact of the lid 20 against the cover main body 10 at the lid-closing position.

The lid 20 is rotatable about the rotatable shafts 22 and the sliding-contacts 17, 23 are formed on the circumferential surfaces having centers at the rotatable shafts 22. Thus, there is no likelihood of reducing or losing the frictional resistance of the sliding-contact surfaces even if the lid 20 is displaced longitudinally displaced with respect to the cover main body 10.

The sliding contacts 17, 23 separate from each other as the lid 20 passes the damping area and moves towards the lid closing position. Accordingly, the biasing forces of the torsion coil springs 30 are not damped by the frictional resistance between the sliding-contact portions 17, 23 when the lid 20 is at the lid-closing position to close the insertion openings 11. Thus, the lid 20 can be held securely at the lid-closing position by the torsion coil springs 30.

The invention is not limited to the above described and illustrated embodiment. For example, the following embodiments also are embraced by the technical scope of the present invention as defined by the claims. Beside the following embodiment, various changes can be made without departing from the scope and spirit of the invention as defined by the claims.

The lid is rotated about the shafts for opening and closing in the foregoing embodiment. However, the lid may be slid opened and closed according to the invention.

The sliding contacts are closer to the rotatable shafts than to the sealing in the foregoing embodiment. However, the sliding contacts may be at positions more distant from the rotatable shafts than from the sealing member according to the present invention.

The sliding contacts are on circumferential surfaces that have centers at the rotatable shafts in the foregoing embodiment. However, they may be arranged on end surfaces extending normal to the rotatable shafts.

The sliding contacts are separated from each other when the lid reaches the lid-closing position in the foregoing embodiment. However, they may be kept in contact even when the lid reaches the lid-closing position.

What is claimed is:

1. An outlet cover, comprising:
   a cover main body fixed to an outer surface of a panel, the cover main body being disposed and configured to expose an insertion opening, at least one bearing projecting from the cover main body and at least one sliding body contact formed on the cover main body in proximity to the bearing;
   a lid having at least one support supported rotationally on the bearing of the cover main body so that the lid is rotatable through an arc of at least 90° between a lid-closing position where the lid closes the insertion opening and a lid-opening position where the lid opens the insertion opening;
   a biasing means for biasing the lid towards the lid-closing position; and
   at least one sliding lid contact formed on the support of the lid and disposed to move through an arc between the bearing and the insertion opening as the lid rotates, the sliding lid contact being configured for sliding in contact with the sliding body contacts on the cover main body as the lid moves rotationally through a dampening area rotationally in proximity to the lid-closing position for damping a biasing force given to the lid by the biasing means.

2. The vehicle outlet cover of claim 1, wherein the biasing means is a torsion coil spring mounted concentrically on one of the shafts.

3. The vehicle outlet cover of claim 1, wherein the lid closing position is spaced rotationally from the lid opening position by about 135°.

4. The vehicle outlet cover of claim 1, wherein the sliding contacts are separated from each other when the lid is at the lid-closing position.

5. The vehicle outlet cover of claim 4, wherein the sliding contacts are separated from each other when the lid is at the lid-opening position.

6. The vehicle outlet cover of claim 5, wherein the sliding contacts are dimensioned so that the dampening area extends through an arc of between about 5° and 25°.

7. The vehicle outlet cover of claim 6, wherein the sliding contacts are dimensioned so that the dampening area extends through an arc of between about 10° and 60°.

8. The vehicle outlet cover of claim 6, wherein the dampening area is spaced from the lid closing position by an arc of between about 5° and 60°.

9. The vehicle outlet cover of claim 8, wherein the dampening area is spaced from the lid closing position by an arc of between about 10°.

10. The vehicle outlet cover of claim 1, wherein the sliding body contact is spaced from the bearing by a distance less than a distance between the bearing and the insertion opening.

11. The vehicle outlet cover of claim 1, wherein the sliding lid contact is spaced from the bearing by a distance less than a distance between the bearing and the insertion opening.

12. The vehicle outlet cover of claim 1, wherein the at least one bearing comprises two bearings and the at least one sliding body contact comprises two sliding body contacts.

13. The vehicle outlet cover of claim 12, wherein the at least one sliding lid contact comprises two sliding lid contacts.

* * * * *